Jan. 29, 1963

H. W. CONIBEAR 3,075,777

FERTILIZER SPREADER

Filed April 4, 1960

Henry W. Conibear
INVENTOR.

BY Clarence A. O'Brien
and Harvey B. Jacobson
Attorneys

Jan. 29, 1963  H. W. CONIBEAR  3,075,777
FERTILIZER SPREADER
Filed April 4, 1960 4 Sheets-Sheet 2

Henry W. Conibear
INVENTOR.

BY Clarence A.O'Brien
and Harvey B. Jacobson
Attorneys

Jan. 29, 1963
H. W. CONIBEAR
3,075,777
FERTILIZER SPREADER
Filed April 4, 1960
4 Sheets-Sheet 3
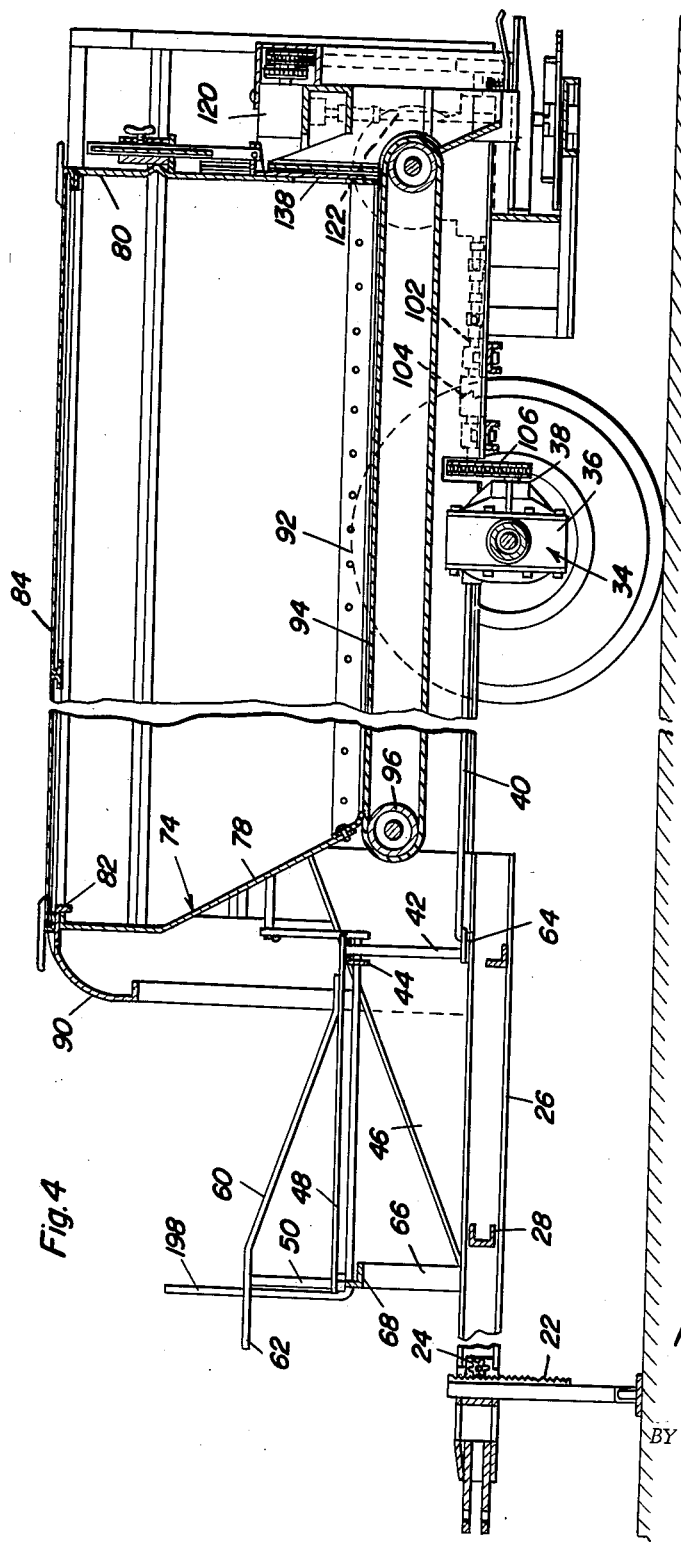
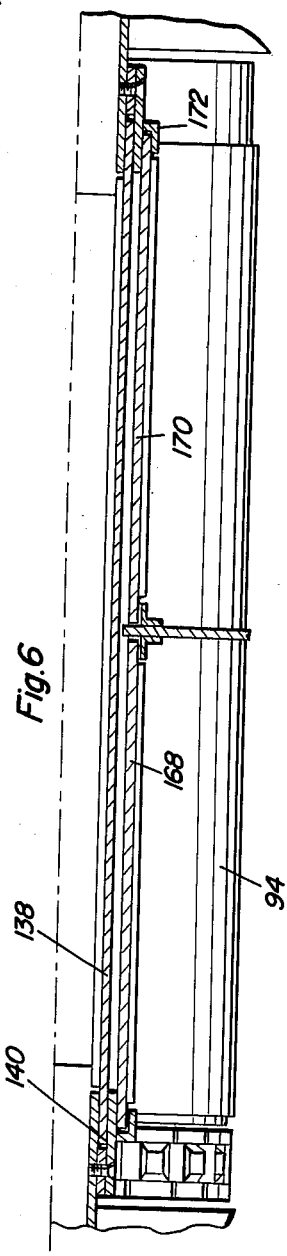
Henry W. Conibear
INVENTOR.
BY *Clarence A. O'Brien*
*and Harvey B. Jacobson*
Attorneys

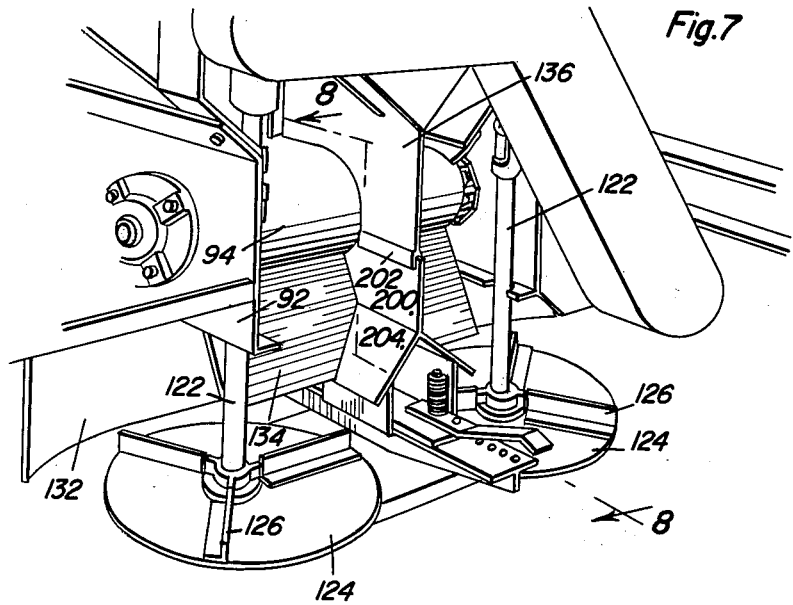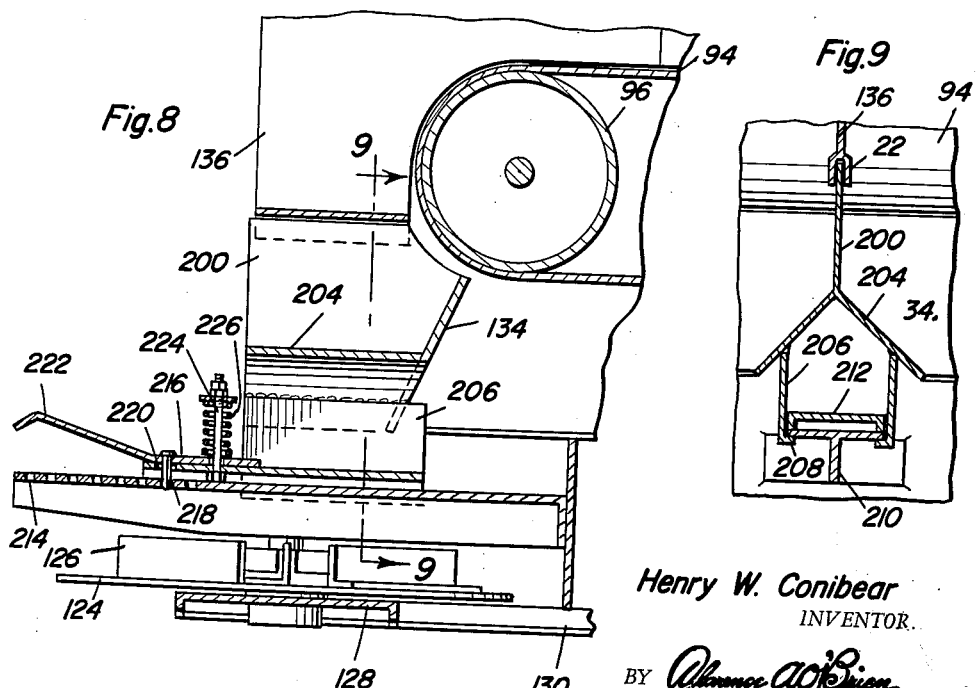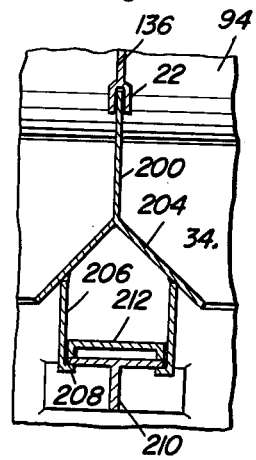

United States Patent Office 3,075,777
Patented Jan. 29, 1963

3,075,777
FERTILIZER SPREADER
Henry W. Conibear, P.O. Box 376, Lakeland, Fla.
Filed Apr. 4, 1960, Ser. No. 19,633
6 Claims. (Cl. 275—8)

The present invention generally relates to a device for spreading fertilizer, lime and other similar materials and more particularly relates to such a fertilizer spreader specifically adapted for use in and spreading such material in citrus tree rows, orchards and the like.

The primary object of the present invention is to provide a fertilizer spreader having rotatable broadcasting fans or distributor plates at the rear thereof together with a longitudinal conveyor forming a portion of the bottom of the body of the spreader all of which are driven from ground engaging wheels so that the material spread will be proportionate to the distance traversed.

Another object of the present invention is to provide a fertilizer spreader generally in the form of a trailer in which the main body is provided with shielded surfaces with curved top and front edges to eliminate crop and tree damage.

A further object of the present invention is to provide a fertilizer spreader in which the distributor plates or fans are disposed relatively low and adjacent the ground surface for spreading fertilizer effectively under trees.

Another feature of the present invention is to provide a fertilizer spreader incorporating in its construction shut-off gates whereby control of the spreading operation may be had from the forward end of the spreader with the shut-off gates enabling either or both sides of the spreading machine to be rendered inoperative for one side spreading or for shutting off the discharge of fertilizer in skipped areas in the grove.

A further feature of the present invention is to provide a fertilizer spreader having a conveyor and distributor plates at the rear thereof which are ground driven by employing a two speed truck axle as a power source thereby ensuring constant fan speed at slow or fast spreader speed.

Yet another feature of the present invention is to provide a fertilizer spreader including mechanism for adjusting the rate of discharge of material together with a test box and scale being provided for accurate poundage setting per acre or per tree.

Still another feature of the present invention is to provide a fertilizer spreader having a mechanism for adjusting the effective range or width of spread to thus vary the pattern as desired.

Other important factors of the present invention reside in its simplicity of construction, efficiency of operation, accuracy in control, adaptation for its particular purposes and its generally inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a longitudinal, sectional view taken substantially upon a plane passing along section line 4—4 of FIGURE 2 illustrating the structural details of the conveyor and main body together with other details of the drive mechanism;

FIGURE 6 is a detailed sectional view taken substantially upon a plane passing along section line 6—6 of FIGURE 5 illustrating the construction of the pair of control gates and the master control gate;

FIGURE 7 is a detailed fragmental perspective view illustrating the structure of the discharge fans and the adjustable deflector associated therewith;

FIGURE 8 is a detail sectional view taken substantially upon a plane passing along section line 8—8 of FIGURE 7 illustrating further structural features of this part of the invention; and FIGURE 9 is a detailed sectional view taken substantially upon a plane passing along section line 9—9 of FIGURE 8 illustrating further structural details of the adjustable deflector.

Figure 1:
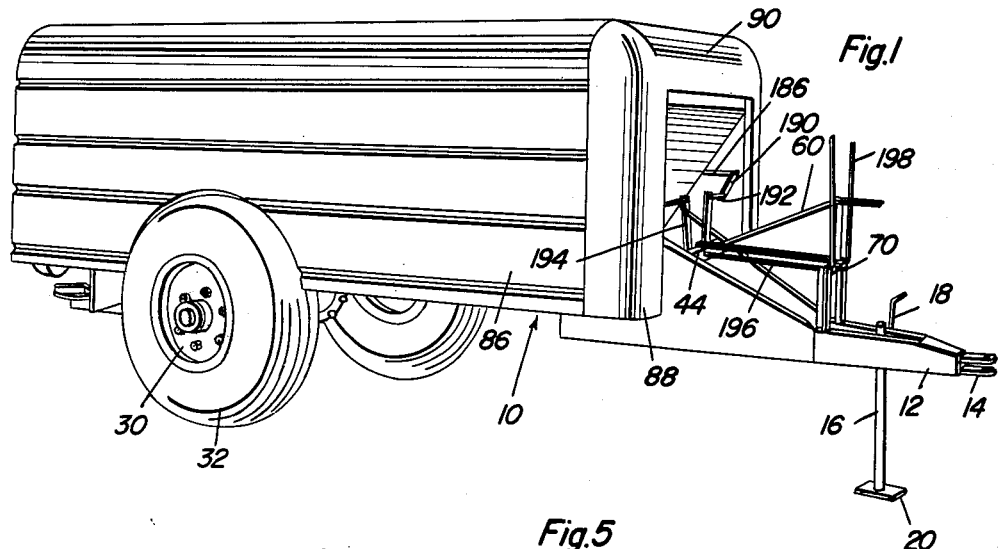
FIGURE 1 is a perspective view of the forward end of the fertilizer spreader illustrating the hitch structure and the over-all configuration thereof illustrating the rounded edges of the main body.
Figure 5:
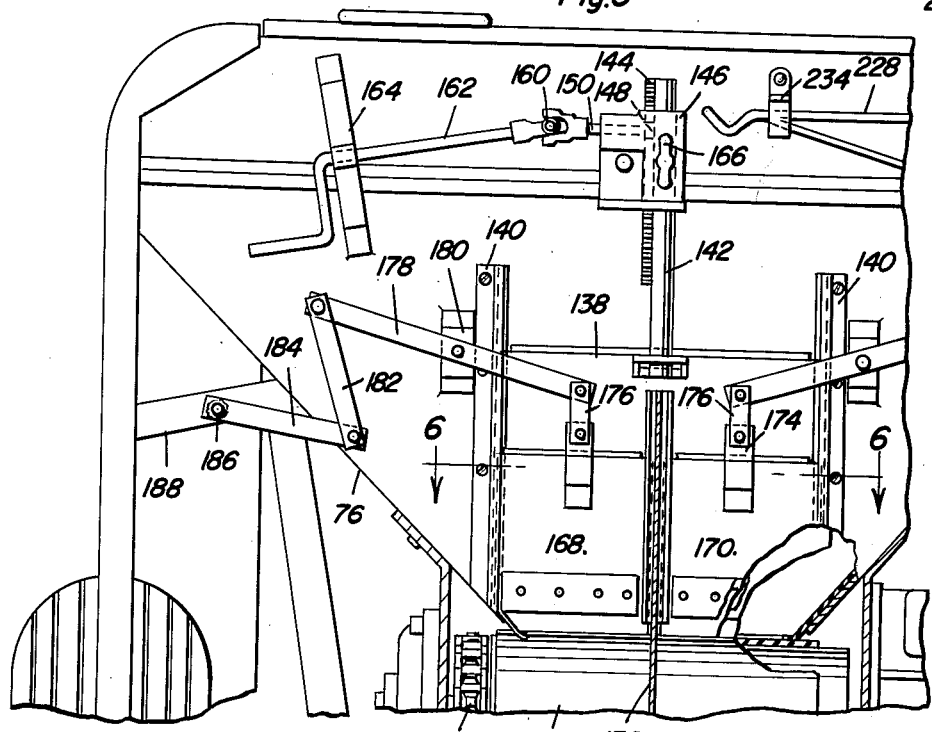
FIGURE 5 is a partial rear elevational view illustrating the control gate mechanism and the relationship thereof to the conveyor with parts broken away for clarity.
Figure 2:
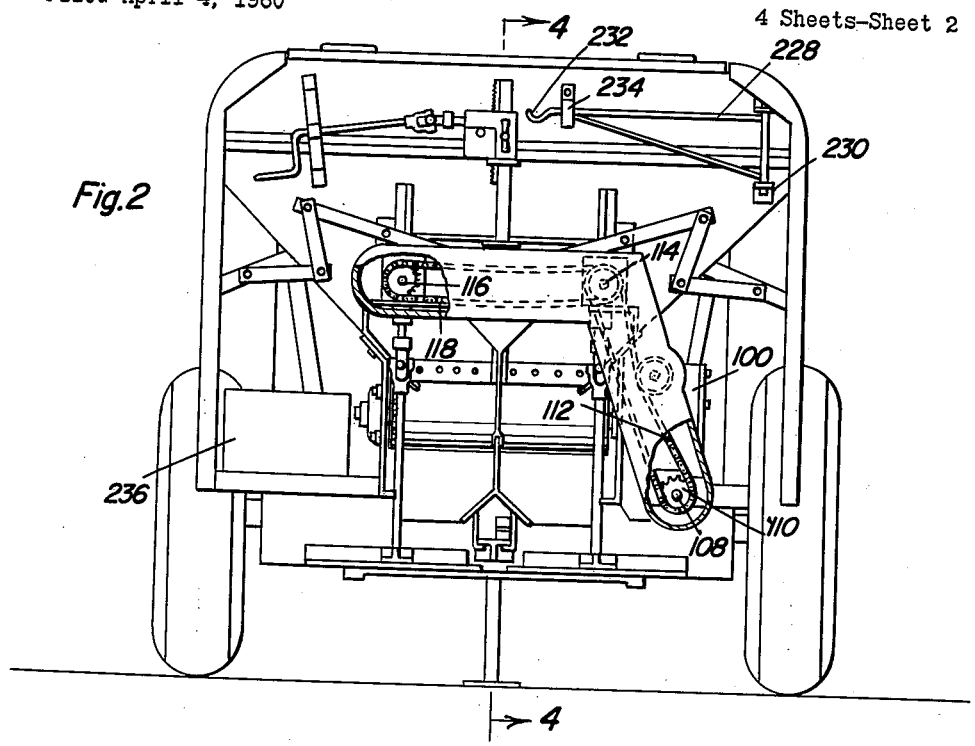
FIGURE 2 is a rear elevational view of the construction of FIGURE 1 with portions of the shield for the drive mechanism broken away illustrating the structure thereof.
Figure 3:
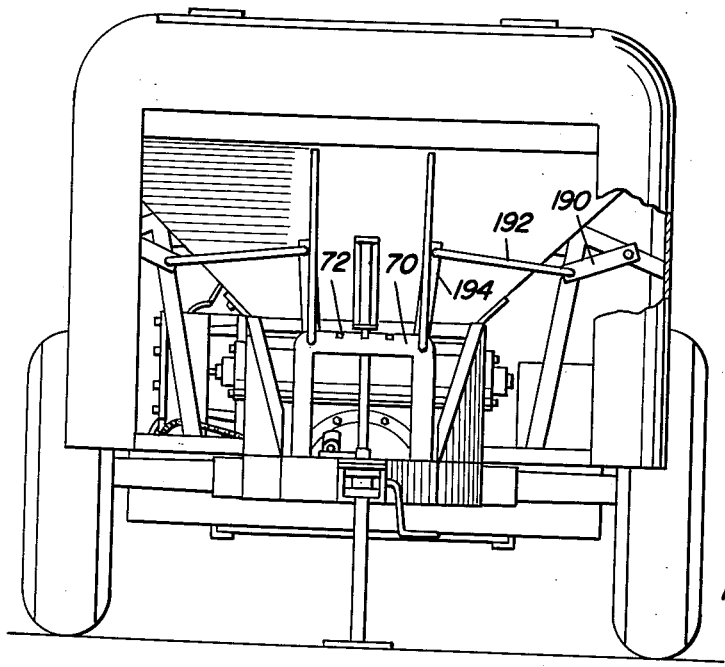
FIGURE 3 is a front end view of the fertilizer spreader.

Referring now specifically to the drawings, the numeral 10 generally designates the fertilizer spreader of the present invention which generally is in the form of a trailer for attachment to a tractor and includes a forwardly extending tongue 12 having lugs 14 extending forwardly therefrom for detachable engagement with a tractor drawbar (not shown) or any other type of towing vehicle. The tongue 12 is provided with an adjustable prop 16 which may be raised and lowered by a crank handle 18 with the prop 16 having a foot plate 20 thereon for engaging the ground surface and supporting the forward end of the fertilizer spreader when it is disconnected from the tractor or other towing vehicle. The details of the elevating mechanism for the prop 16 is illustrated in FIGURE 4 and includes a rack 22 rigid with the prop and a pinion 24 mounted on the crank which is journaled in the tongue 12 and in mesh with the rack gear 22 for raising and lowering the prop 16.

The tongue 12 has the rear portion thereof formed by a pair of diverging frame rails 26 interconnected by transverse frame elements 28 thereby forming a rigid forward end structure.

Disposed adjacent the rear of the fertilizer spreader is a pair of supporting wheels 30 each having a ground engaging pneumatic tire 32 thereon. Interconnecting the wheels 30 is a two speed rear truck axle generally designated by the numeral 34 and which is of conventional construction and which includes a housing 36 provided with an output shaft 38. Disposed on the housing 36 is a shift lever connecting with a shift rod 40 extending forwardly and connected with an upstanding arm 42 pivotally supported from a transverse member 44 extending between triangular plates 46 forming upstanding members from the frame rails 26. Attached to the upper end of the arm 42 is an elongated operating arm 48 with an upstanding rod 50 at the forward end thereof and an angulated handle forming strap member 60 extending between the rear end of the arm and upwardly and beyond the upper end of the rod 50 thereby providing a forwardly projecting handle 62 for pivoting the arm 48 about the vertical axis formed by the upstanding rod 42 at the forward end of the rod 40 with it being noted that the rod 40 is connected to the upstanding rod 42 by virtue of an eccentric arm 64.

Mounted rigidly on the frame rail 26 is an inverted U-shaped member 66 having a transverse bight portion 68 with an upstanding flange 70 thereon having a plurality of spaced notches 72 for engagement with the bottom edge of the swingable arm 48 thereby enabling the arm 48 to be locked in adjusted position. There are three notches 72 on the bight portion 70 which provide for the output shaft 38 being driven at two different speeds or being disposed in an idle condition where it will not be driven by the two speed rear axle.

Mounted in overlying relation to the rear axle is a hollow body or hopper-like structure 74 which includes converging side walls 76 and a rearwardly inclined forward wall 78 and a vertical rear wall 80.

The hopper 74 is provided with an open top 82 having a sliding closure plate 84 mounted thereon for opening and closing the open top for permitting fertilizer to be disposed within the hopper 74. Enclosing the hopper 74 are side walls 86 having arcuate forward shields or corners 88 which are interconnected by a top rounded shield or corner 90 which serves to prevent damage of trees. For example, if a tree limb engages the body, it will be gently pushed aside by the rounded shields 88 and 90 without damaging the tree limbs.

The bottom of the hopper 74 is defined by a frame member 92 having a conveyor belt 94 underlying the frame member 92 and generally forming a closure for the body or hopper 74. The conveyor belt 94 is supported on end rollers 96 in the usual manner of such conveyor belts in which one roller is longitudinally adjustable by any suitable means for providing for adjustment of the tension on the belt 94. The rear roller 96 is driven from a sprocket gear 98 thereon that is connected with a gear case 100 which is a reduction unit and which is drivingly connected to the output shaft 38 of the two speed rear axle 34 by virtue of a transfer shaft 102 having a dog clutch 104 therein and connected drivingly with the output shaft 38 by a chain sprocket drive connection 106.

The reduction unit 100 is also provided with an output shaft 108 driving a sprocket gear 110 and a drive chain 112 which in turn drives an input shaft 114 that in turn drives another input shaft 116 by virtue of a chain drive connection 118 with the input shafts 114 and 116 being connected with gear transfer cases 120 respectively each having a depending power shaft 122 which extends downwardly and supports on the lower end thereof a circular distributing plate or fan 124 having a plurality of radially extending upstanding flanges 126 thereon. The bottom ends of the shafts 122 and the plates 124 are supported by a transversely extending support plate 128 rigidly attached to a rearwardly extending frame member 130. Extending between the frame member 130 and the bottom of the frame member 92 forming the bottom of the hopper is a curved deflector 132 partially curving around the edges of the plates 124 and also an inclined deflector plate 134 extends from the bottom of the conveyor belt downwardly and rearwardly to direct fertilizer onto the spreader plates 124.

Disposed above the rear end portion of the conveyor and generally conforming to the surface thereof is a partition plate 136 which substantially separates the conveyor into two separate discharge areas with the respective sides of the conveyor discharging fertilizer onto the respective broadcast or distributor plates. Thus, as the fertilizer is discharged from the conveyor belt 94, it is separated into two separate areas with these areas respectively discharging onto the inclined plate 134 and thence onto the distributor plates 124.

For controlling flow of material over the rear of the belt 94, there is provided a main cut-off plate or control gate 138 slidably disposed in vertical trackways 140. The control gate 138 is movable to a position closely adjacent the upper surface of the belt 94 to prevent movement of material to the discharge position. The center of the control gate 138 is provided with an upwardly extending rod 142 having a rack 144 alongside one edge thereof. The rod 142 is slidable through a bearing sleeve 146 which also forms a support for a pinion gear 148 in meshing engagement with the rack 144. The pinion gear 148 is carried by a shaft 150 having a universal connection 160 with a handle 162 journaled in a bracket 164 whereby rotation of the handle 162 will effect raising and lowering of the control gate 138. A wing type setscrew 166 is provided for locking the rod 142 in adjusted position thereby locking the control gate 138 in vertically adjusted position. The control gate 138 closes off both discharge areas of the conveyor 94 and may be employed as a metering plate to determine the quantity of material discharged by the conveyor belt 94 by varying the free area above the conveyor belt 94.

Mounted rearwardly of the control gate 138 is a pair of separate control gates 168 and 170 for the two areas of the conveyor belt disposed on either side of the partition 136. The control gates 168 and 170 are slidable in vertical trackways 172 and each is provided with a bracket 174 having a link 176 pivotally attached thereto. The other end of the link is connected with a fulcrum lever 178 pivoted centrally on a bracket 180. The other end of the lever 178 is connected to a link 182 which in turn is connected to one end of an arm 184 carried by an elongated control rod 186 that is supported in brackets 188 and which extends to the forward end of the trailer structure. The forward end of the rod 186 is provided with an offset arm 190 pivotally attached to a connecting rod 192 that has the other end thereof connected with an operating arm 194 extending laterally from a rotatable rod 196 journaled in the inverted U-shaped member 68 and also in the transverse member 64. The forward end of the rod 196 is provided with an elongated upstanding handle 198 swingable in a transverse plane for raising and lowering the position of the two individual control gates 168 and 170 thereby individually controlling the flow from the areas of the conveyor belt.

Disposed below the partition 136 and forming a continuation thereof is a deflector plate 200 having the upper edge slidably received in a downwardly facing channel 202 on the partition 136. The lower end of the deflector 200 is provided with a pair of outwardly extending wing portions 204. Each wing portion 204 is provided with a depending vertical plate 206 rigidly connected to the undersurface thereof which terminates in an inwardly extending flange 208 on the lower end thereof which extends under the upper flange of a T-shaped structural member 210 which extends longitudinally and rearwardly of the fertilizer spreader. The plates 206 are interconnected by a transverse plate 212 overlying the structural member 210 and the structural member 210 is provided with a plurality of longitudinally spaced apertures 214 for locking the deflector 200 in longitudinally adjusted position.

Mounted on the transverse plate 212 is a plate 216 having a depending pin 218 thereon which extends downwardly through an enlarged opening 220 in the plate 212 for engagement with selective of the apertures 214. The plate 216 is provided with a rearwardly extending handle 222 and is mounted on an upstanding bolt 224 having a spring 226 thereon which engages the plate 216 and retains it against the transverse plate 212. However, by raising on the handle 222, the pin 218 may be retracted from the apertures 214 thus enabling the plate 212 and the deflector 200 to be moved longitudinally in relation to the broadcast plates 124 thereby varying the pattern of spread of the broadcast plates 124.

Disposed above the control mechanism for the gates is a swingable bracket 228 having one end thereof pivotally attached to support brackets 230 and the other end provided with a hook shaped support element 232. The bracket is retained in collapsed condition by a pivotal retaining latch 234 and the bracket 228 is provided for holding a weighing scale so that a test box may be employed for determining the rate of discharge from the conveyor thereby gauging the quantity of discharge of the fertilizer spreader. The test or weighing box is designated by the numeral 236 and may be positioned on structural member 210 for making a test weighing after removing the material divider assembly 200—212 from member 210.

The test box 236 may be supported on member 210 by the same type of track as at 208 since it is important that the test box is in the correct position to receive all of the material from the conveyor belt.

The purpose of the adjustable deflector is to have the fertilizer, lime or other material engage the rotatable broadcast fans or plates in a particular position or spot on the surface of the rotatable fan to obtain the desired width of spread. The width of spread may extend to thirty feet or more depending upon the pattern desired and the device may be adjusted for spreading from 100 pounds of material per acre to two tons of material per acre.

The driving mechanism including the chain drives for the broadcast is provided with a removable cover for safety and also to prevent entrance of fertilizer dust or the like for retaining the drive mechanism properly lubricated and eliminating excessive wear thereof.

The spreader can be operated either on the fast or slow side of a two-speed axle with heavy poundage per acre being discharged on the fast side at a relatively slow tractor speed and on the slow side of the two-speed axle for lighter poundage at a greater tractor speed. The conveyor speed is positively controlled by the ground drive which insures an even poundage output regardless of tractor speed. Lock mechanisms may be provided for the smaller control gates 168 and 170 if desired and the edges of the hopper where the bottom opening is may be provided with sealing flexible strips for preventing leakage of fertilizer off the sides of the conveyor belt thus assuring that all of the fertilizer will be discharged rearwardly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fertilizer spreader comprising a mobile frame, a bin mounted on said frame with the bin having an open bottom extending longitudinally thereof, a conveyor belt underlying the open bottom of the bin and forming a closure therefor for conveying the ingredients of the bin longitudinally thereof, said conveyor belt having a rear discharge end, a pair of rotatable broadcasting plates mounted under the rear discharge end of the conveyor belt for scattering the material discharged from the conveyor belt, said mobile frame including ground engaging wheels, and gear reduction mechanism interconnecting the ground engaging wheels and the conveyor belt for driving the conveyor belt at a relatively slow linear speed, and drive means interconnecting the ground engaging wheels and the rotatable broadcasting plates for driving the broadcasting plates at a relatively high rotational speed, said drive means interconnecting the ground engaging wheels and the conveyor belt and broadcasting plates including a speed varying mechanism for varying the quantity of material discharged from the bin in proportion to the distance traversed by the frame, the rear of said bin being provided with a vertically movable control gate disposed in perpendicular overlying relation to the conveyor belt for controlling the rate of discharge from the bin, a centrally disposed divider plate being disposed above the discharge end of said conveyor belt, said divider plate being orientated rearwardly of the control gate for dividing the conveyor belt for discharge of equal quantities of material onto the broadcast plates, said divider plate including a movable bottom portion extending below the conveyor belt and including outwardly flared deflector plates for varying the pattern of spread of the broadcast plates, a pair of closure gates provided rearwardly of the control gate, said closure gates being disposed on opposite sides of the divider plate, and operating control rods for said pair of closure gates extending forwardly of the bin for access to the control rods from the operator's seat of a tractor or other suitable towing implement.

2. The combination of claim 1 wherein said bin is provided with depending panel side and end walls with the upper edge thereof being rounded to prevent snagging engagement with fruit tree limbs and the like.

3. The structure as defined in claim 1 wherein each of the closure gates is individually controlled and adjustable relative to the other of said closure gates.

4. A fertilizer spreader comprising a mobile frame, a bin mounted on said frame with the bin having an open bottom extending longitudinally thereof, a conveyor belt underlying the open bottom of the bin and forming a closure therefor for conveying the ingredients of the bin longitudinally thereof, said conveyor belt having a rear discharge end, a pair of rotatable broadcasting plates mounted under the rear discharge end of the conveyor belt for scattering the material discharged from the conveyor belt, said mobile frame including ground engaging wheels, and gear reduction mechanism interconnecting the ground engaging wheels and the conveyor belt for driving the conveyor belt at a relatively slow linear speed, and drive means interconnecting the ground engaging wheels and the rotatable broadcasting plates for driving the broadcast plates at a relatively high rotational speed, said drive means interconnecting the ground engaging wheels and the conveyor belt and broadcasting plates including a speed varying mechanism for varying the quantity of material discharged from the bin in proportion to the distance traversed by the frame, the rear of said bin being provided with a vertically movable control gate disposed in perpendicular overlying relation to the conveyor belt for controlling the rate of discharge from the bin, a centrally disposed divider plate being disposed above the discharge end of said conveyor belt said divider plate being orientated rearwardly of the control gate for dividing the conveyor belt for discharge of equal quantities of material onto the broadcast plates, said divider plate including a movable bottom portion extending below the conveyor belt and including outwardly flared deflector plates for varying the pattern of spread of the broadcast plates.

5. A fertilizer spreader comprising a mobile frame, a bin mounted on the frame, said bin having downwardly converging side walls terminating in spaced relation thus forming an open bottom extending longitudinally thereof, an elongated conveyor belt disposed under the open bottom of the bin and forming a closure therefor whereby ingredients from the bin may be discharged onto the conveyor belt and moved longitudinally thereof for discharge from one end of the conveyor belt, a pair of rotatable broadcasting plates supported from the frame and disposed in underlying relation to the discharge end of the conveyor belt for receiving material therefrom and broadcasting the material laterally, means drivingly connected with the broadcasting plates for rotating the broadcasting plates about a generally vertical axis, means drivingly connected to the conveyor belt for moving the material on the conveyor belt to the discharge end, both of said drive means being connected to ground engaging driving wheels, and a clutch mechanism interposed between the driving wheels and the drive means for selectively varying the speed of the broadcast plates and conveyor belt, a longitudinally adjustable vertically extending divider plate disposed at the discharge end of the conveyor belt and including a portion overlying the top run of the belt and a portion disposed longitudinally outwardly of the end of the belt thereby dividing the discharge end of the belt into two separate paths for discharge of the material onto the broadcast plates, the lower end of the divider plate being provided with a longitudinally adjustable deflector means disposed between the broadcasting plates and the discharge end of the conveyor belt whereby the material discharged from the conveyor belt will be discharged onto the broadcast plates at varying positions for varying the pattern of spread of the plate.

6. The structure as defined in claim 5 wherein the longitudinally adjustable deflector means comprise a vertically extending plate slidably received within a downwardly facing channel on the lower end of the divider plate, downwardly diverging plates secured to the lower end of the vertically extending plate, said downwardly diverging plates directed toward the broadcast plates, and means adjustably supporting the longitudinally adjustable deflector means.

References Cited in the file of this patent

UNITED STATES PATENTS

| | | |
|---|---|---|
| Re. 22,020 | Fulkerson et al. | Feb. 10, 1942 |
| 790,266 | Sester | May 16, 1905 |
| 1,033,297 | Barth | July 23, 1912 |
| 1,526,704 | Hird | Feb. 17, 1925 |
| 2,088,285 | Bogvad | July 27, 1937 |
| 2,296,909 | Dake | Sept. 29, 1942 |
| 2,340,657 | Goertzen | Feb. 1, 1944 |
| 2,451,553 | Hedquist et al. | Oct. 19, 1948 |
| 2,484,325 | Watcher | Oct. 11, 1949 |
| 2,493,451 | Gaddis et al. | Jan. 3, 1950 |
| 2,564,494 | Morrison | Aug. 14, 1951 |
| 2,705,149 | Torrey | Mar. 29, 1955 |
| 2,798,726 | Bottlander | July 9, 1957 |
| 2,799,510 | Schmidt | July 16, 1957 |
| 2,813,722 | Pawela | Nov. 19, 1957 |
| 2,988,368 | Kerr | June 13, 1961 |

FOREIGN PATENTS

| | | |
|---|---|---|
| 263,565 | Switzerland | Dec. 1, 1949 |